May 20, 1924.

W. C. STARR

FLEXIBLE TREAD WHEEL

Filed Sept. 23, 1922

1,494,511

Inventor
W. C. Starr

By C. A. Snow & Co.
Attorney

Patented May 20, 1924.

1,494,511

UNITED STATES PATENT OFFICE.

WYATT C. STARR, OF ORLANDO, FLORIDA.

FLEXIBLE-TREAD WHEEL.

Application filed September 23, 1922. Serial No. 590,073.

*To all whom it may concern:*

Be it known that I, WYATT C. STARR, a citizen of the United States, residing at Orlando, in the county of Orange and State of Florida, have invented a new and useful Flexible-Tread Wheel, of which the following is a specification.

This invention aims to provide a wheel so constructed that it will travel over soft ground without sinking therein, novel means being provided whereby the treads are held on the rim of the wheel, yieldingly so that they may conform to the movement of the wheel as the wheel rolls.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
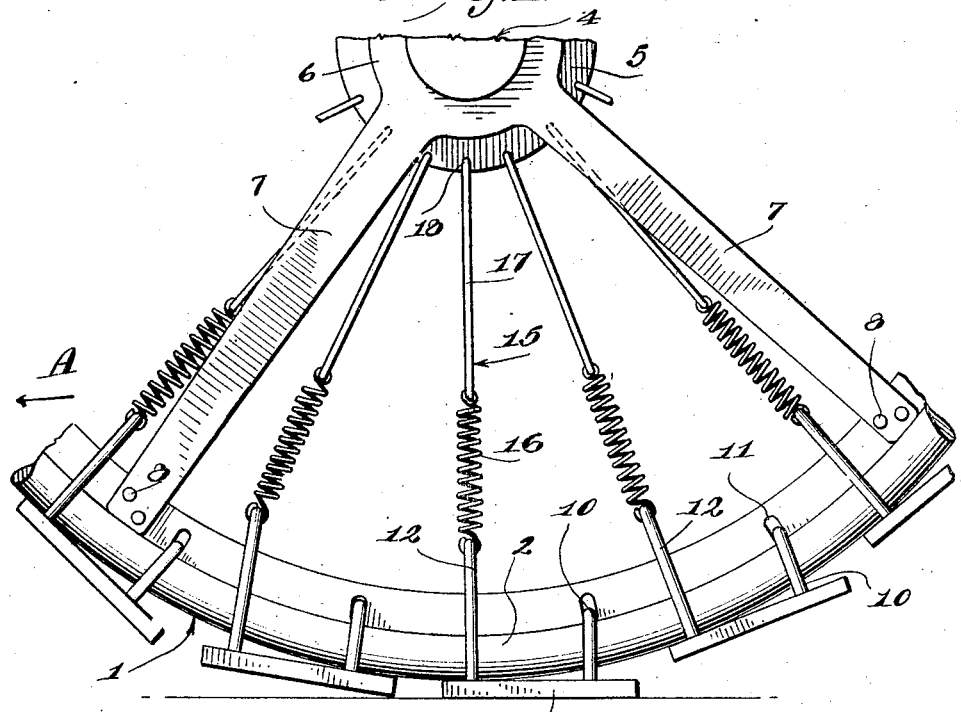
Figure 2:
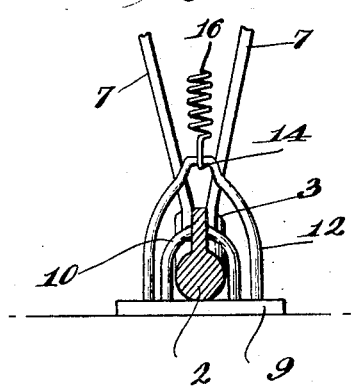
Figure 3:
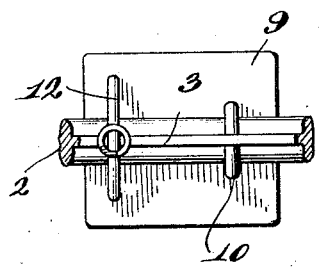
Figure 4:
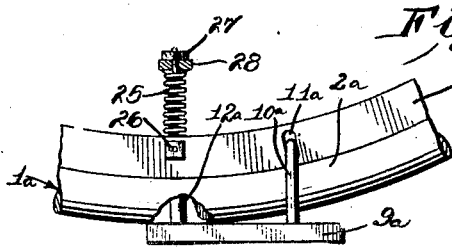

Figure 1 shows in elevation, a portion of a wheel constructed in accordance with the invention; Figure 2 is a radial section; Figure 3 is a top plan showing one of the treads, a portion of the rim of the wheel appearing; Figure 4 is a fragmental section wherein a modified form is shown.

The wheel forming the subject matter of this application includes a rim 1 comprising a body 2 carrying an inwardly projecting flange 3. The numeral 4 designates a hub comprising a central member 5 and spoke plates 6 on opposite sides thereof, the spoke plates carrying spokes 7 which converge as they extend toward the rim 1, the outer ends of the spokes being disposed on opposite sides of the flange 3 of the body 2, and being secured thereto as indicated at 8. Treads 9 in the form of rigid plates are provided. Each tread 9 is provided, adjacent to one end with a U-shaped yoke 11 extended around the body 2 of the rim 1 and received for limited movement in an elongated slot 11 fashioned radially in the flange 3 of the body 2. The construction is such that the tread 9 is assembled pivotally with the body 2 adjacent to one end of the tread. Adjacent to its opposite end, the tread 9 carries a U-shaped arm 12 surrounding the rim 1, but spaced therefrom. The inner end of the arm 12 is contracted to form a seat 14, receiving one end of a yieldable connection 15, the connection including a retractile spring 16 and a rod 17. The outer end of a spring 16 is pivotally mounted in the seat 14 of the arm 12 on the tread 9, the inner end of the spring being pivotally assembled with the outer end of the rod 17, and the inner end of the rod 17 being pivotally connected with the member 5 of the hub, as shown at 18.

In practical operation, the springs 16 coact to hold the treads 9 against the body 2 of the rim 1, when the treads are out of contact with the ground. Suppose that the wheel is rolling in the direction of the arrow A in Figure 1. When the rear end of the tread 9 comes into contact with the ground, the spring 16 is elongated and the connection 15 swings with respect to the member 5 of the hub 4. As the wheel rides along the tread 9, from one end thereof to the other, the yoke 10 moves outwardly in the slot 11, the construction being such that none of the strain is thrown on the pivotal connection 10—11 between the tread 9 and the rim 1. After the tread 9 has passed out of contact with the ground, the parts are restored to the position shown at the right hand end of Figure 1.

The device is so constructed that it will operate smoothly and without jar, the rim rolling evenly along the treads 9. Owing to the increased area afforded by the treads 9, the structure may be used on soft ground and the wheel will not sink thereinto. The structure, further, can be used on roads which, ordinarily, are broken or injured when heavy vehicles, such as traction engines, agricultural machines or the like pass thereover.

In the modification shown in Figure 4, parts hereinbefore described are designated by numerals previously used, with the suffix "a". The arm 12a is broadened as indicated at 28, so that one end of a compression spring 25 may be secured thereto as at 27, the other end of the compression spring being secured at 26 to the flange 3a. The spring 25 replaces the spring 16 of Figure 1.

What is claimed is:—

1. A wheel comprising a rim; treads coacting with the rim; and U-shaped members assembled with the treads, one of the U-shaped members having limited movement in the rim, and the other of the U-shaped members extending about the rim; and spring means assembled with the last specified U-shaped member for resisting the swinging movement of the tread with respect to the rim.

2. A device of the class described comprising a rim having openings; treads; U-shaped yokes carried by the treads and mounted in the openings of the rim for pivotal movement and for limited movement radially of the rim; retractile elements; and means for connecting said elements with the treads, and with the wheel of which the rim constitutes a part, in spaced relation to the rim.

In testimony that I claim the foregoing as my own, I have hereto affixed my signature in the presence of two witnesses.

WYATT C. STARR.

Witnesses:
W. A. LYON,
C. C. MAXFIELD.